UNITED STATES PATENT OFFICE.

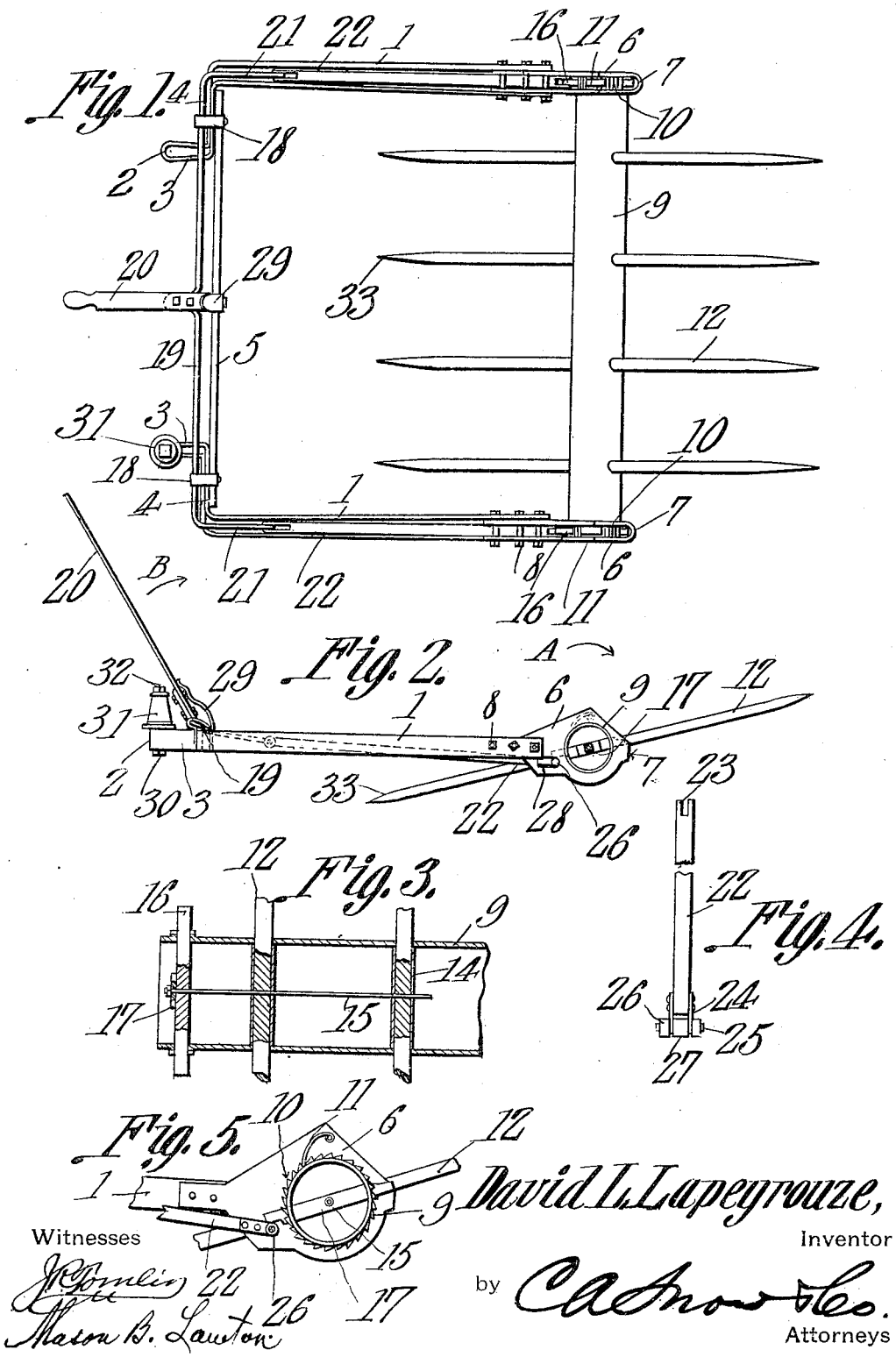

DAVID L. LAPEYROUZE, OF THIBODAUX, LOUISIANA.

HAY-RAKE.

993,531.　　　　　Specification of Letters Patent.　　Patented May 30, 1911.

Application filed April 11, 1910.　Serial No. 554,838.

*To all whom it may concern:*

Be it known that I, DAVID L. LAPEYROUZE, a citizen of the United States, residing at Thibodaux, in the parish of Lafourche and State of Louisiana, have invented a new and useful Hay-Rake, of which the following is a specification.

The device forming the subject matter of this application, is a rake structure, so constructed that, when the cultivator disks are removed from a wheel cultivator of ordinary construction, the rake may readily be mounted upon the cultivator, in the place of the disks, the wheel mounted cultivator frame thus being made effective as a means for carrying the raking mechanism hereinafter shown and described.

It is the object of the invention to provide a frame for a rake, adapted to be connected with a vehicle, such as a wheel-mounted cultivator frame; to provide a raking element of novel and improved construction; and to provide novel means for holding the raking mechanism against movement, while the raking operation is being carried forward.

In the accompanying drawings,—Figure 1 shows the invention in top plan; Fig. 2 is a side elevation thereof; Fig. 3 is a fragmental longitudinal section of the teeth carrying shaft; Fig. 4 is an elevation of one of the stops; and Fig. 5 is a fragmental side elevation, external parts being broken away to reveal internal construction.

In carrying out the invention there is provided, as a primary and fundamental element, a frame, the same consisting of side bars 1. These side bars 1 are preferably fashioned from a single strip of metal, bent sharply upon itself as denoted by the numeral 2, so that the side bars 1 are double walled elements. The side bars 1 include forwardly extended, U shaped arms 3, disposed parallel to, and between, the body portions of the side bars 1. The intermediate portions 4 of the side bars 1 are disposed at right angles to the arms 3. These intermediate portions 4 of the side bars 1 are connected by means of a cross bar 5.

Secured to the rear ends of the side bars 1 are heads 6, the same being U shaped, and bent sharply upon themselves, as shown at 7. The ends of the heads 6 are connected with the rear ends of the side bars 1 by means of bolts 8, or other suitable connecting elements.

Journaled for rotation in the heads 6, is a hollow shaft 9. The portions of the shaft 9 which are disposed between the side walls of the heads 6, are provided with ratchets 10, adapted to be engaged by pawls 11, pivotally mounted in the heads 6, the coöperation between the pawls 11 and the ratchets 10 being such that the shaft 9 is restrained thereby against rearward rotation, that is, against rotation in the direction of the arrow A of Fig. 2.

Pointed rake teeth 12 are extended transversely through the shaft 9. Surrounding these teeth 12 in the interior of the shaft 1, and bearing terminally against the inner walls of the shaft, are collars 14. A connecting member, in the present instance shown in the form of a rod 15, is disposed longitudinally of the shaft 9 in the interior thereof. This rod 15 is extended through the teeth 12 and through the collars 14 which surround the teeth. In the ends of the shaft 9, there are openings, adapted to receive the transversely disposed arms 16, outstanding beyond the outer face of the shaft 9. The connecting member 15 is extended through these arms 16; washer plates 17 are superposed upon the outer faces of the arms 16, and nuts or like securing devices are mounted upon the ends of the rod 15 to bear against the washer plates 17.

Mounted on the cross bar 5, are bearings 18 in which is rotatably disposed, a rock shaft 19, the intermediate portion of which is connected with an upstanding lever 20. At its ends, the rock shaft 19 carries rearwardly extended arms 21, located between the constituent walls of the side bars 1. The extremities of these arms 21 are pivotally connected between the bifurcated ends 23 of stops 22, the stops 22 being located between the constituent walls of the side bars 1. Plates 24 are secured to the stops 22, adjacent the rear ends of the stops, and in these plates 24 is mounted transversely, a shaft 25. Journaled for rotation upon the shaft 25, upon the outside of the plates 24, are rollers 26, a single roller 27 being mounted for rotation upon the shaft 25 between the plates 24. The outer rollers 26 are disposed in the elongated slots 28 in the heads 6, the construction therefore being such that the rear ends of the stops 22 are mounted in the frame of the device, both for sliding and for pivotal movement.

Fixed to and rising from the intermediate portion of the cross bar 5, is a spring tongue 29, the upper end of which bears against the lever 20. By this construction, the rollers 26 are normally thrust rearwardly against the ends of the slots 28, the inner roller 27, being thus held within the path of movement of the ends of the arms 16, the shaft 9 thus being held against rotation. The arms 3 of the side bars 1 are adapted to receive bolts 30, having conoidal heads 31, adapted to be mounted in the sockets of a cultivator frame, which said sockets normally carry the cultivator disks. Nuts or the like 32 are mounted upon the upper ends of the bolts 30, the device thus being held rigidly in place.

The device is adapted to be mounted upon vehicles of any sort, preferably however, as hereinbefore stated, upon a wheel-mounted cultivator frame. In such case, the disks of the cultivator are removed, and replaced by the heads 31, the nuts 32 serving to hold the frame of the rake rigidly upon the wheel-mounted cultivator frame, to space the rake frame a slight distance from the ground.

The parts of the device will normally be disposed as shown in Figs. 1 and 2. In such instance, the hay will be accumulated upon the forwardly extended rake teeth 33. When it is desired to dump the rake, the free upper end of the lever 20 is moved in the direction of the arrow B, the arms 21 of the rock shaft 19 drawing the stops 22 forwardly, the rollers 26 moving in the slots 28, and the inner roller 27 being withdrawn from beneath the ends of the arms 16. Thus, the shaft 9 will be free to rotate, and the forwardly extended rake teeth 33 will move rearwardly, dumping their load.

When the operating lever 20 is released, the spring 29 will throw the operating lever into the position shown in Fig. 2, the stops 22 being slid rearwardly, so that the inner rollers 27 are disposed in the path of the ends of the arms 16, the rake teeth thus being positioned to continue the raking operation. The coöperation between the ratchets 10 of the shaft 9 and the pawls 11, serves to prevent the shaft from being rotated accidentally, in the direction of the arrow A. It is to be noted that the arms 16 constitute at once, a means for retaining the shaft 9 in place in the frame, and, as well, a means, engageable by the stops 22, for holding the shaft 9 against rotation.

By reason of the fact that the collars 14 abut terminally against the inner walls of the shaft 9, these collars, coöperating with the rod 15, serve to prevent the teeth 12 from sliding longitudinally in the shaft in which they are mounted. Moreover, the arms 16 serve as a mounting for the ends of the rod 15, preventing the said rod from sliding longitudinally.

Having described the invention, what is claimed is:—

1. A device of the class described comprising a frame arranged to be removably connected with a vehicle; a teeth-carrying shaft journaled for rotation in the frame; a stop slidably and pivotally mounted at one end in the frame; a rock shaft mounted upon the frame and pivotally connected with the other end of the stop; means upon the teeth-carrying shaft to engage the stop; and means for operating the rock shaft.

2. A device of the class described comprising a double walled frame arranged to be removably connected with a vehicle; a teeth-carrying shaft journaled for rotation in the frame; a stop disposed between the walls of the frame; spaced anti-friction devices carried by the stop adjacent one end, and slidably mounted in the walls of the frame; means upon the teeth-carrying shaft for engaging the stop between the anti-friction devices; and means for advancing and retracting the stop.

3. A device of the class described comprising a frame arranged to be removably connected with a vehicle; a teeth-carrying shaft journaled for rotation in the frame; a locking device operative to engage the shaft against forward rotation; and pawl and ratchet mechanism independent of the locking device and arranged to hold the shaft against rearward rotation only.

4. A device of the class described comprising a frame; a teeth-carrying shaft journaled for rotation in the frame; transverse arms extended through the shaft and constituting a means for retaining the shaft in the frame; and a locking device normally held in the path of the arms to limit the rotation of the shaft.

5. A device of the class described including a hollow shaft; rake teeth extended transversely through the shaft; a connecting member disposed longitudinally of the shaft in the interior thereof and arranged to engage the teeth; arms transversely mounted in the shaft and adapted to receive the ends of the connecting member; a frame in which the shaft is journaled for rotation; and a locking device upon the frame, adapted to engage the arms to hold the shaft against rotation.

6. A device of the class described including a hollow shaft; rake teeth extended transversely through the shaft; collars upon the rake teeth having terminal contact with the interior of the shaft; a connecting member disposed longitudinally of the shaft in the interior thereof and arranged to engage the collars and the teeth; arms transversely mounted in the shaft and arranged to engage the ends of the connecting member; a frame in which the shaft is journaled for rotation; and a locking device mounted
5 upon the frame and adapted to engage the arms to hold the shaft against rotation.

In testimony that I claim the foregoing as my own, I have hereto affixed my signature in the presence of two witnesses.

DAVID L. LAPEYROUZE.

Witnesses:
R. J. NAQUIN,
S. R. COULON.

Copies of this patent may be obtained for five cents each, by addressing the "Commissioner of Patents, Washington, D. C."